Sept. 30, 1924.  F. F. BRUCKER  1,510,449
METHOD OF MANUFACTURING MACHINE BELTS
Filed Sept. 23, 1921
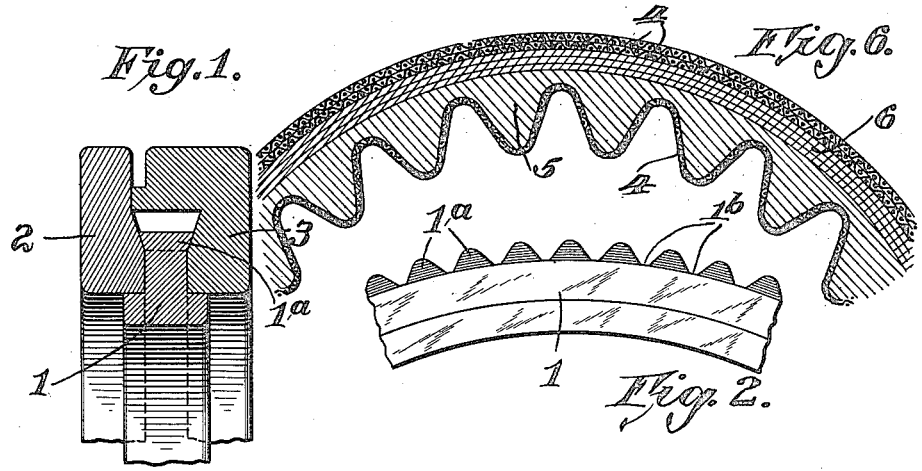
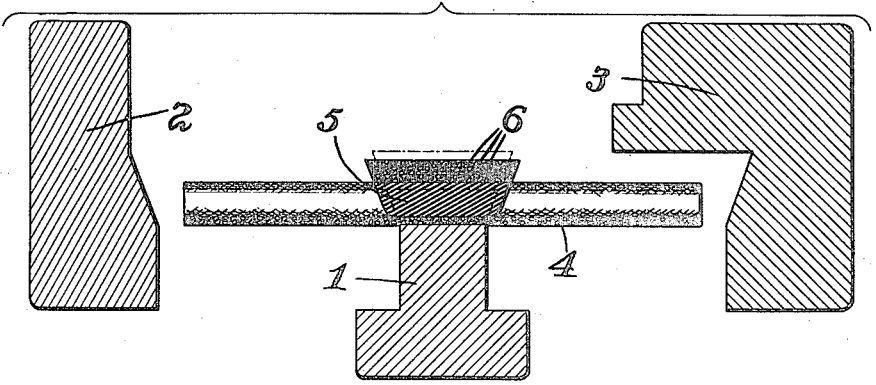
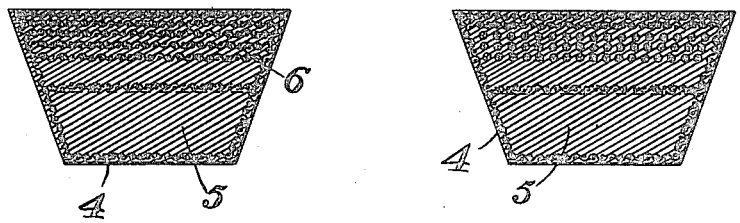
Inventor:
Ferdinand F. Brucker,
By Spear, Middleton, Donaldson & Hall
Attys.

Patented Sept. 30, 1924.

1,510,449

UNITED STATES PATENT OFFICE.

FERDINAND F. BRUCKER, OF AKRON, OHIO, ASSIGNOR TO THE MILLER RUBBER COMPANY, OF AKRON, OHIO, A COMPANY OF OHIO.

METHOD OF MANUFACTURING MACHINE BELTS.

Application filed September 23, 1921. Serial No. 502,635.

*To all whom it may concern:*

Be it known that I, FERDINAND F. BRUCKER, a citizen of the United States, and resident of Akron, in the county of Summit, in the State of Ohio, have invented certain new and useful Improvements in Methods of Manufacturing Machine Belts, of which the following is a specification.

My present invention relates to machine belts and the method of manufacturing the same and is designed more particularly for the production of a belt suitable for use in motor vehicles for driving the fans thereof, though not limited to such use.

Such belts are required to travel at very high speed around small grooved pulleys and much difficulty has heretofore been experienced in securing a belt of the requisite strength which would not crack and break in a comparatively short period.

The present invention aims to overcome such difficulty and the invention includes the novel article and method of making the same hereinafter described and particularly defined by the appended claims.

In order that my invention may be better understood I have appended hereto drawings illustrative of a belt and the mold in which the same is made and also showing the belt in process of construction.

In these drawings—

Figure 1 is a cross section through one side of an annular mold such as may conveniently be used for carrying out my improved method.

Fig. 2 is a side elevation of a portion of one of the core elements.

Fig. 3 is a sectional view on a larger scale illustrating the manner of assembling the belt forming material.

Fig. 4 is a sectional view of the completed belt.

Fig. 5 is a view of a modification.

Fig. 6 is a side elevation in section of the belt.

Referring by reference characters to these drawings, the numeral 1 designates an annular ring former having side walls which are flared at their outer portions to correspond to the desired wedge shaped formation of the belt, and having teeth 1ª on the periphery, preferably rounded, providing intervening recesses 1ᵇ. Cooperating with this former are two mold sections 2 and 3 designed to abut against the side walls of the former and be positioned accurately by the flanges 1ᶜ thereof, the whole forming when assembled a closed annular mold cavity.

In proceeding according to my improved method the toothed peripheral surface of the former is first coated with rubber cement which is allowed to dry whereupon a layer of fabric 4, impregnated with rubber, is laid around the toothed surface and pressed into the recesses, or in other words, into intimate contact with such peripheral surface.

The fabric strip is of a width such that it will project beyond the sides of the former to provide wings, as shown in Fig. 3 which are to be subsequently folded around the body of the belt as hereinafter described, and is of such length as to preferably enable the ends to slightly overlap.

Small pieces of rubber compound 5, corresponding in shape to the spaces or recesses between the teeth of the former, are then applied to such recesses, such pieces being of a size to project slightly on each side of the former. Thereafter a plurality of plies of rubber imprenated cord fabric 6, shown as three, gradually increasing widths (corresponding to the flaring shape of the belt) are drawn tightly around the former over the filler blocks or pieces 5, each convolution being lapped at the ends, and the margins of the fabric layer 4 are formed over the side edges of the blocks 5 and cord fabric 6 and turned to overlap each other above the cord fabric, it being understood that the fabric 4 is of the bias cut type which enables it to be applied smoothly without wrinkles.

The assembled belt structure is then rolled down on the former, the object being to build the belt slightly wider than the former but not quite so high as the mold cavity. The former and applied belt structure are then inserted in mold section 3 and section 2 applied, and the assembled mold is then placed in a hydraulic press and vulcanized in the manner well understood by those skilled in the art.

The resulting belt has an outer strain or tension resisting fabric portion and an inner rubber compression compensating portion adapted to conform without buckling to the grooved faces of the pulleys in passing around the same, it being understood that the belt is designed for use with smooth faced grooved pulleys and not toothed pulleys. The inner portion formed by the rubber blocks and bias fabric adapts itself to the pulley grooves and any inequalities therein and affords firm frictional contact therewith while the cord fabric furnishes the requisite strength to withstand the driving strains.

Such a belt has been found in actual practice to be non-slipping, extremely strong and durable, and not detrimentally affected by oil, heat or water.

Instead of using cord fabric for the tension portion, I may use a winding of individual cords as shown in Fig. 5. As a further modification, instead of using individual rubber blocks or pieces to fill the former recesses, I may apply to the former a strip of unvulcanized rubber compound and force this down into the recesses by pressure, and if desired the pressure may be secured by winding the tension element tightly enough to force the rubber into the recesses.

As hereinbefore stated the rubber blocks or pieces are of such a size as to project somewhat on each side of the former.

The result is that as the mold sections are pressed together to close the mold, the blocks or pieces 5 are upset (so to speak) or displaced radially so as to tend to force the cord structure outwardly, thus putting it under further tension. In other words, the flow of rubber produces internal pressure which places tension on the cord structure and produces a pre-stretched belt which is a very desirable feature.

Having thus described my invention what I claim is:

1. The hereindescribed method of making machine belts which consists in applying a band of bias cut friction fabric to the toothed periphery of an endless former with the side edges of the fabric projecting, filling the recesses with rubber compound, winding on said rubber compound rubberized cord tension material, folding the edges of said bias fabric around said tension material, and vulcanizing the whole together.

2. The hereindescribed method of making machine belts which consists in supporting an endless strip of bias rubberized fabric so that it will be transversely waved or pleated, filling the exterior recesses formed by said waves or pleats with rubber compound, applying over the surface of said rubber compound rubberized cord tension material, folding the margins of said bias fabric around said tension material and vulcanizing the whole together.

3. The hereindescribed method of making machine belts which consists in supporting rubber compound in the form of an endless ring or band, winding thereabout strain resisting material, subjecting the sides of said rubber compound to pressure to tension the strain resisting material, and vulcanizing the whole together.

4. The hereindescribed method of making machine belts which consists in supporting rubber compound in the form of an endless transversely corrugated ring or band, winding thereabout strain resisting material, subjecting the sides of said rubber compound to pressure to tension the strain resisting material, and vulcanizing the whole together.

In testimony whereof I affix my signature.

FERDINAND F. BRUCKER.